United States Patent Office 3,506,613
Patented Apr. 14, 1970

3,506,613
NOVEL POLYMERS PREPARED FROM ALIPHATIC DIKETONES AND ALIPHATIC DIAMINES
John W. Bayer, Toledo, Ohio, assignor to Owens-Illinois, Inc., a corporation of Ohio
No Drawing. Continuation-in-part of application Ser. No. 472,058, July 14, 1965. This application Jan. 15, 1969, Ser. No. 791,523
Int. Cl. C08g *15/00*
U.S. Cl. 260—65
2 Claims

ABSTRACT OF THE DISCLOSURE

There is disclosed the novel preparation of novel polymers that exhibit fluorescence when subjected to selected activation energy. The preparation comprises reacting an aliphatic or aromatic substituted aliphatic diketone and an aliphatic diamine such that there results a linear, non-cross-conjugated polymer exhibiting fluorescence under appropriate energy excitation, said polymer having no chromophore groups in its structure which will internally absorb the fluorescence emission of the polymer.

RELATED CASE

This is a continuation-in-part of copending U.S. patent application Ser. No. 472,058, filed July 14, 1965, and now abandoned.

THE INVENTION

This invention relates to the novel preparation of novel polymers that exhibit fluorescence when subjected to selected activation energy. More particularly, the present invention relates to polymers produced by the reaction of aliphatic diamines with diketones (as more particularly defined hereinafter) to produce polyazines which have the particularly desirable property of fluorescing under proper excitation and which are thereby suitable for a wide variety of purposes.

In the prior art, polymers have been prepared by reacting amines and ketones. However, such preparations have comprised the use of aromatic and/or trifunctional monomers and have typically resulted in polymers which do not exhibit fluorescence. Although fluorescence exhibiting polymers have resulted from such prior art preparations, the fluorescence property has been due to the presence of chromophore groups, e.g., such as aromatic radicals, which inherently tend to exhibit fluorescence independently of the polymer, especially when such chromophore groups are in a cross-conjugating position.

In accordance with this invention, it has been discovered that aliphatic diamine(s) and aliphatic or aromatic substituted aliphatic diketone(s) may be reacted to prepare a linear, non-cross-conjugated polyazine which exhibits fluorescence under appropriate energy excitation, said polyazine having no chromophore groups in its polymeric structure which will internally absorb the fluorescence emission of the polymer; that is, chromophore groups with an absorption edge overlapping the fundamental fluorescence emission band of the linear polyazine.

More particularly, in accordance with this invention, there is prepared a linear, non-cross-conjugated polyazine which contains the recurring structure represented by the structural formula:

(I) 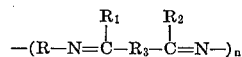

wherein R is a divalent hydrocarbon radical which is an aliphatic hydrocarbon group or cycloaliphatic hydrocarbon groups $R_1$ and $R_2$ are the same or different monovalent aliphatic, or cycloaliphatic, or aromatic substituted aliphatic hydrocarbon groups, each group preferably having 1 to 12 carbon atoms, and $R_3$ is an aliphatic or cycloalipahtic group having 1 to 4 carbon atoms, and containing no conjugated atoms, and $n$ is a number with a value of at least 2.

In accordance with a preferred embodiment of this invention, there is prepared polymers of the recurring structure represented by Formula I wherein R is a divalent hydrocarbon group as defined above and containing from 1 to 12 carbon atoms, $R_1$ and $R_2$ are alkyl groups from 1 to 12 carbon atoms and $R_3$ is an alkylene group containing from 1 to 4 carbon atoms.

Polymers of the foregoing structure are known as polyazines and have desirable properties in general. However, the polyazines prepared in the practice of this invention exhibit fluorescence when subjected to selected excitation energy, such as long wave ultraviolet light, thereby making such polymers particularly valuable for many useful purposes.

To produce the polyazines of this invention, a selected aliphatic diamine is reacted with a selected aliphatic or aromatic substituted aliphatic diketone under appropriate conditions to yield the desired polyazine structure.

Suitable aliphatic diamines which may be used herein include those having the structural formula:

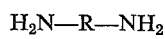

wherein R is a divalent aliphatic or cycloaliphatic hydrocarbon group having 1 to 12 carbon atoms such as alkylene, e.g., methylene, ethylene and propylene through dodecylene, both normal and isometric forms, cyclohexylene and similar cycloalkylene groups, and the like.

The aliphatic or aromatic substituted aliphatic diketones that are reacted with the foregoing diamines according to this invention are represented by the structural formula:

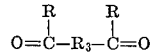

wherein $R_1$ and $R_2$ are the same or different monovalent aliphatic cycloaliphatic, or aromatic substituted aliphatic hydrocarbon groups, preferably containing 1 to 12 carbon atoms, e.g., alkyls such as methyl, ethyl, propyl, cyclohexyl and similar cycloalkyl groups, phenyl substituted alkyls and the like, and $R_3$ is an aliphatic divalent hydrocarbon residue containing no conjugated atoms and having 1 to 4 carbon atoms, e.g., alkylene such as methylene, ethylene, and cycloalkylene such as cyclohexylene, and the like.

Examples of suitable aliphatic diamines include hexamethylene diamine, ethylene diamine and menthane diamine. Suitable aliphatic or aromatic substituted aliphatic diketones include acetyl acetone, 2,5 hexane dione, 2,3, butanedione, and 1 phenyl 1,3-butanedione.

In preparing the polyazines of this invention, the selected diamine and diketone are reacted under appropriate conditions to yield the desired polymer. Generally, the reaction mixture containing the diamine and the diketone is heated to reflux temperatures. After the reaction has proceeded, the water of condensation that is formed in the course of the reaction is removed by any suitable means such as distillation. Thereafter, the desired product is recovered. Depending on the extent of polymerization, proportions, particular ingredients and the like, the nature of the resulting product can vary considerably, ranging from liquids through waxes to solid materials. Depending upon the ultimate use, the reaction may be halted at any point and the product recovered to obtain specific desired characteristics.

The novel polymers of this invention are also particularly suitable for compounding and blending with other resins such as polyethylene, polyacrylates, polyepoxides, etc., in an amount sufficient to impart fluorescence to the resulting blend when the blend is exposed to suitable high energy activation. For example, when blended with polyethylene, the composition will fluoresce under a long wave ultraviolet light. Waxy polymers of this invention may also be used as a plasticizing agent for a synthetic resin such as nylon, for example, to produce a plasticized fluorescent polymer composition. Thus, the polyazines of this invention may be blended with synthetic resins of various types, with particularly suitable results being obtained with thermoplastic polymers of an ethylenically unsaturated monomer.

Although an important use of the polymers of the present invention resides in compounding with other resins to produce plasticization and/or fluorescent effect, the higher molecular weight polyazines may be thermosetting or thermoplastic depending on the starting materials and can therefore be used without blending with other resins to produce articles of manufacture of varying types that will fluoresce under appropriate excitation energy. Thus various shaped articles can be made from the novel polyazines of this invention and the foregoing uses are intended to be illustrative only of the wide variety of applications for such polymers.

The following Examples I to VI serve to illustrate the present invention including some of the best modes contemplated by the inventor in the practice thereof.

EXAMPLE I

Reaction of 1,6-hexamethylene diamine and acetyl acetone. 10 grams (.167 mole) of acetyl acetone were heated to reflux with 11 grams (0.0985 mole) of 1,6-hexamethylene diamine. Soon thereafter the temperature dropped to 102° C. showing water was formed. After 2 hrs. the condenser was turned to distillation. The temperature gradually rose to 250° C. at which point the reaction mixture was poured into aluminum cups. A waxy material resulted. This waxy material fluoresced under long wave ultraviolet light with a blue color.

EXAMPLE II

Reaction of ethylene diamine and acetyl acetone. 12 grams (.2 moles) of ethylene diamine were reacted in Example I with 20 grams (.333 mole) of acetyl acetone. After refluxing the mixture for about 2 hrs. the condenser was turned to distillation. The distillation was completed at 200° C. and the product was thereafter removed and observed to be a dark fluid which fluoresced under long wave ultraviolet light with a blue color.

EXAMPLE III

Reaction of menthane diamine and acetyl acetone. 20.0 grams (0.2 mole) of acetyl acetone and 31.2 grams (0.2 mole) of menthane diamine were reacted as in the foregoing examples. The reaction mixture was heated until the pot temperature reached 290° C. and distilled for about 3 hours until 4.2 milliliters of water was collected. The reaction product was poured into aluminum cups to cool. A dark, viscous resin resulted. The resin fluoresced under long wave ultraviolet light with a blue color.

EXAMPLE IV

Reaction of hexanediamine and 2,5 hexane dione. 17.1 grams (0.15 mole) of 2,5 hexane dione and 17.4 grams (0.15 mole) of 1,6 hexanediamine was reacted as in the foregoing examples. The reaction mixture was heated to 240° C. and distilled for 3 hours until 10 milliliters of an azeotrope was collected. A solid, waxy resin resulted. The resin fluoresced under long wave ultraviolet light with an intense blue color.

EXAMPLE V

Reaction of ethylene diamine and 2,3 butanedione. 12.9 grams (0.15 mole) of the butanedione was placed in a 250 milliliter flask and 9.0 grams (0.15 mole) of the diamine added slowly with a dropping funnel. The mixture was then heated to a temperature of 97° C. for 3 hours. Upon cooling a dark brown, viscous resin resulted. The resin slightly fluoresced under long wave ultraviolet light with a blue color.

EXAMPLE VI

Reaction of hexanediamine and acetyl acetone. 23.2 grams (0.2 mole) of 1,6 hexanediamine and 20.0 grams (0.2 mole) of acetyl acetone were heated to reflux for about 2 hours and 5–6 milliliters of distillate collected. The pot temperature gradually increased to 300° C. The reaction product was then cooled by pouring into an aluminum cup. A tan waxy solid resin resulted which fluoresced under long wave ultraviolet light with a deep blue.

By way of comparison with the embodiments of this invention illustrated in Examples I to VI, Example VII is presented hereinafter:

EXAMPLE VII

Reaction of glyoxal and ethylene diamine. 5.8 grams of glyoxal (19.3 grams of a solution of 30 percent by weight glyoxal in water) was placed in a 250 milliliter flask and 6.0 grams of the diamine slowly added. The reaction was refluxed for 2 hours and the water distilled off. By the time the pot temperature reached 200° C., 16 milliliters of distillate had been collected. Upon cooling a dark, flexible polymer resulted. The polymer did not fluoresce when tested with ultraviolet light and other radiation.

The proportions of the reactants which are combined to produce the novel polyazine resins of this invention can vary over a considerable range. The preferred ratio is about 1 mole of the aliphatic diketone to about 0.6 mole of the diamine; however, the ratio can be extended in either direction so long as there is a polymerizing proportion of reactants present. Generally, the mole ratio of diketone to diamine ranges from about 1:1 to about 2:1. Reflux conditions are generally used in heating the diamine with the aliphatic diketone and the water that is formed as a result of the reaction is removed by distillation. The characteristics of the resulting polymeric product can vary from a liquid material to a waxy material to a thermosetting resin. The exact nature will depend on the choice of reactants, reaction conditions and the like. It is not intended that the scope of the present invention be limited to any specific physical characteristics of the polymer.

Various other modifications will be apparent to and can readily be made by those skilled in the art without departing from the scope and spirit of this invention.

I claim:

1. A linear, non-cross-conjugated polyazine which fluoresces when subjected to appropriate energy excitation, said polyazine represented by the formula:

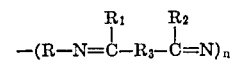

wherein R is a divalent aliphatic or cycloaliphatic hydrocarbon radical containing from 1 to 12 carbon atoms, $R_1$ and $R_2$ are the same or different monovalent aliphatic, cycloaliphatic, or aromatic substituted aliphatic hydrocarbon groups, each having 1 to 12 carbon atoms, $R_3$ is an aliphatic hydrocarbon or cycloaliphatic hydrocarbon group having 1 to 4 carbon atoms and containing no conjugated atoms, and $n$ is a number with a value of at least 2.

2. The polyazine of claim 1 werein R is an alkylene group, $R_1$ and $R_2$ are the same or different alkyl groups, and $R_3$ is a alkylene group.

References Cited

UNITED STATES PATENTS

| | | | |
|---|---|---|---|
| 2,652,367 | 9/1953 | Adelson | 252—46.7 |
| 2,659,712 | 11/1953 | Thompson et al. | 260—65 |

WILLIAM H. SHORT, Primary Examiner

L. L. LEE, Assistant Examiner

U.S. Cl. X.R.

252—301.2; 260—583, 896